(12) United States Patent
Lee

(10) Patent No.: US 12,322,386 B2
(45) Date of Patent: Jun. 3, 2025

(54) DISPLAY DEVICE AND OPERATION METHOD FOR SAME

(71) Applicant: LG ELECTRONICS INC., Seoul (KR)

(72) Inventor: Donghee Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 241 days.

(21) Appl. No.: 17/628,847

(22) PCT Filed: Jul. 22, 2019

(86) PCT No.: PCT/KR2019/009044
§ 371 (c)(1),
(2) Date: Jan. 20, 2022

(87) PCT Pub. No.: WO2021/015319
PCT Pub. Date: Jan. 28, 2021

(65) Prior Publication Data
US 2022/0319511 A1    Oct. 6, 2022

(51) Int. Cl.
*G10L 15/22*     (2006.01)
*G10L 15/07*     (2013.01)
*G10L 15/30*     (2013.01)

(52) U.S. Cl.
CPC .............. *G10L 15/22* (2013.01); *G10L 15/07* (2013.01); *G10L 15/30* (2013.01); *G10L 2015/223* (2013.01)

(58) Field of Classification Search
CPC ......... G10L 15/22; G10L 15/07; G10L 15/30; G10L 2015/223; G10L 15/1822;
(Continued)

(56) References Cited

U.S. PATENT DOCUMENTS 5,924,070 A * 7/1999 Ittycheriah ........ H04M 3/42204
704/275
8,843,369 B1 * 9/2014 Sharifi .................... G10L 25/03
704/235
(Continued)

FOREIGN PATENT DOCUMENTS

JP    2000172293    6/2000
KR    20160010961   1/2016
(Continued)

OTHER PUBLICATIONS

PCT International Application No. PCT/KR2019/009044, International Search Report dated Apr. 20, 2020, 4 pages.
(Continued)

*Primary Examiner* — Thuykhanh Le
(74) *Attorney, Agent, or Firm* — LEE, HONG, DEGERMAN, KANG & WAIMEY

(57) ABSTRACT

The present disclosure is for more accurately recognizing voice commands continuously uttered by a user, and may include: a voice acquisition module configured to recognize a voice; and a controller configured to, when acquiring a second voice command after acquiring a first voice command through the voice acquisition module, execute a function corresponding to the second voice command when the controller determines that the second voice command is a voice command connected to the first voice command.

12 Claims, 12 Drawing Sheets

(58) Field of Classification Search
CPC ..... G10L 25/51; G10L 2015/228; G06F 3/16; G06F 3/167
USPC ........................................................ 704/270
See application file for complete search history.

(56) References Cited

U.S. PATENT DOCUMENTS

| | | | |
|---|---|---|---|
| 9,098,467 B1* | 8/2015 | Blanksteen | G10L 15/22 |
| 10,685,652 B1* | 6/2020 | Cherukuri | G06F 3/167 |
| 10,826,862 B1* | 11/2020 | Suprasadachandran Pillai | H04L 51/224 |
| 11,138,334 B1* | 10/2021 | Garrod | G10L 15/02 |
| 11,223,699 B1* | 1/2022 | Niewczas | G06F 3/167 |
| 11,450,315 B2* | 9/2022 | Kim | G10L 15/22 |
| 2003/0144844 A1* | 7/2003 | Colmenarez | G10L 15/24 704/E15.041 |
| 2006/0161440 A1* | 7/2006 | Nakayama | G01C 21/3608 704/270 |
| 2009/0164113 A1* | 6/2009 | Kang | G01C 21/3608 701/443 |
| 2011/0054899 A1* | 3/2011 | Phillips | G10L 15/30 704/235 |
| 2011/0060587 A1* | 3/2011 | Phillips | G10L 15/30 704/235 |
| 2011/0125503 A1* | 5/2011 | Dong | G10L 21/0216 704/E15.001 |
| 2012/0192196 A1* | 7/2012 | Yasuda | G06Q 10/10 718/103 |
| 2013/0080177 A1* | 3/2013 | Chen | G10L 15/183 704/275 |
| 2013/0085753 A1* | 4/2013 | Bringert | G10L 15/32 704/E15.039 |
| 2013/0185072 A1* | 7/2013 | Huang | G10L 25/72 704/246 |
| 2014/0163977 A1* | 6/2014 | Hoffmeister | G10L 15/32 704/232 |
| 2014/0249817 A1* | 9/2014 | Hart | G06F 3/167 704/254 |
| 2015/0053781 A1* | 2/2015 | Nelson | G05D 23/1902 236/1 C |
| 2015/0100313 A1* | 4/2015 | Sharma | G10L 15/28 704/235 |
| 2015/0348548 A1* | 12/2015 | Piernot | G10L 15/22 704/235 |
| 2017/0110144 A1* | 4/2017 | Sharifi | G10L 15/02 |
| 2017/0169817 A1* | 6/2017 | VanBlon | G10L 15/02 |
| 2017/0206900 A1* | 7/2017 | Lee | H04R 1/406 |
| 2018/0174581 A1* | 6/2018 | Wang | G10L 13/02 |
| 2018/0190279 A1* | 7/2018 | Anderson | G10L 15/22 |
| 2018/0336269 A1 | 11/2018 | Dobrynin et al. | |
| 2019/0049942 A1* | 2/2019 | Dusane | G10L 15/22 |
| 2019/0096398 A1* | 3/2019 | Sereshki | G10L 15/08 |
| 2019/0139545 A1* | 5/2019 | Yuan | G10L 15/08 |
| 2019/0302867 A1* | 10/2019 | Cheng | H04W 52/0229 |
| 2019/0348044 A1* | 11/2019 | Chun | G06Q 30/0601 |
| 2019/0362714 A1* | 11/2019 | Mori | G10L 15/22 |
| 2020/0051554 A1* | 2/2020 | Kim | G06F 3/167 |
| 2020/0160857 A1* | 5/2020 | Alameh | G10L 15/22 |
| 2020/0184972 A1* | 6/2020 | Kolavennu | G10L 15/08 |
| 2020/0286475 A1* | 9/2020 | Ji | G06N 5/022 |
| 2020/0349927 A1* | 11/2020 | Stoimenov | G10L 17/24 |
| 2020/0365139 A1* | 11/2020 | Kawano | G10L 15/063 |
| 2020/0380981 A1* | 12/2020 | Tom | G06Q 30/0251 |
| 2021/0210082 A1* | 7/2021 | Taira | G10L 15/02 |
| 2021/0304735 A1* | 9/2021 | Gao | H04R 3/005 |
| 2021/0383794 A1* | 12/2021 | Kim | G06F 3/167 |
| 2022/0027398 A1* | 1/2022 | Dobrynin | G06F 9/451 |
| 2022/0109669 A1* | 4/2022 | Yuh | H04N 21/44227 |
| 2022/0157293 A1* | 5/2022 | Fujita | G10L 21/0208 |

FOREIGN PATENT DOCUMENTS

| | | |
|---|---|---|
| KR | 10-2018-0080112 | 7/2018 |
| KR | 20180084392 | 7/2018 |
| KR | 20180098409 | 9/2018 |
| KR | 20190056115 | 5/2019 |

OTHER PUBLICATIONS

Korean Intellectual Property Office Application No. 10-2021-7042440, Office Action dated Dec. 19, 2024, 5 pages.

* cited by examiner

FIG. 6

| Voice command | First execution context | Second execution context | Required context |
|---|---|---|---|
| 'Find action movie' | Searching | Contents | Navigation/Contents |
| 'right' | Navigation | scroll | Navigation/scroll |
| 'Find OO on the Internet' | Searching | Web | Searching/scroll |
| 'Channel up' | Navigation | Channel | Navigation/Channel |
| 'Play channel 10' | Channel | Channel | Channel |
| 'down' | scroll | scroll | Contents/scroll |

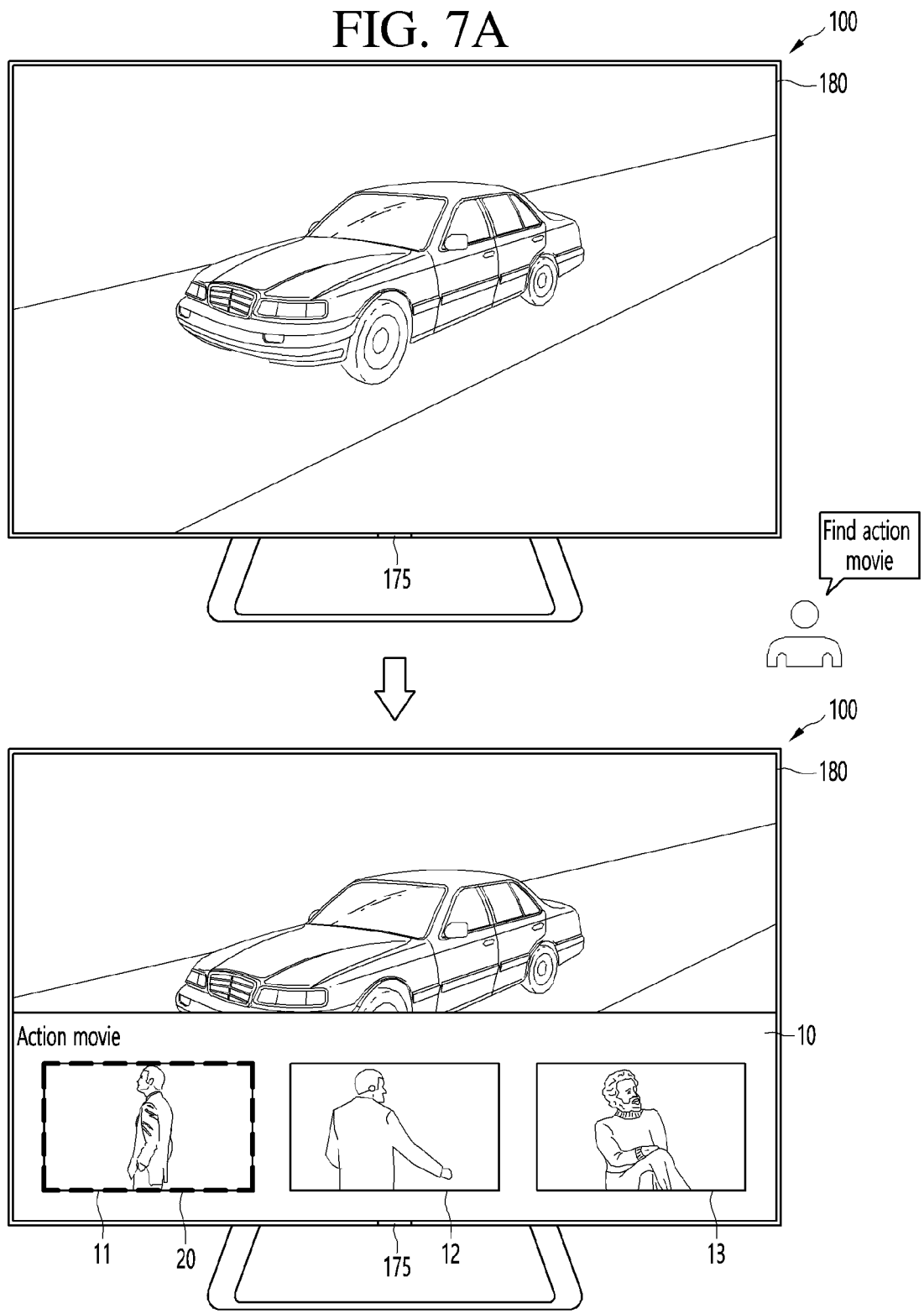

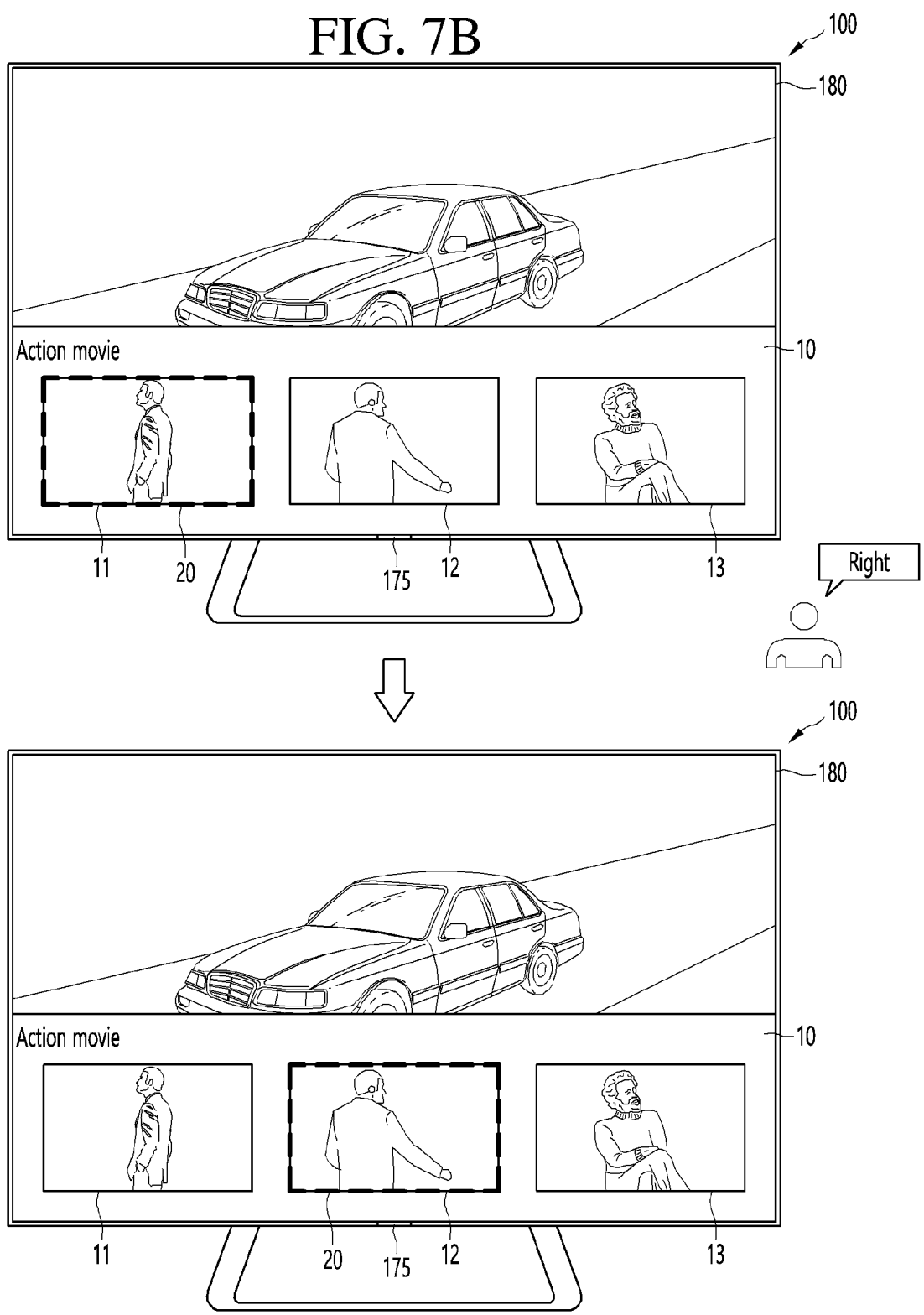

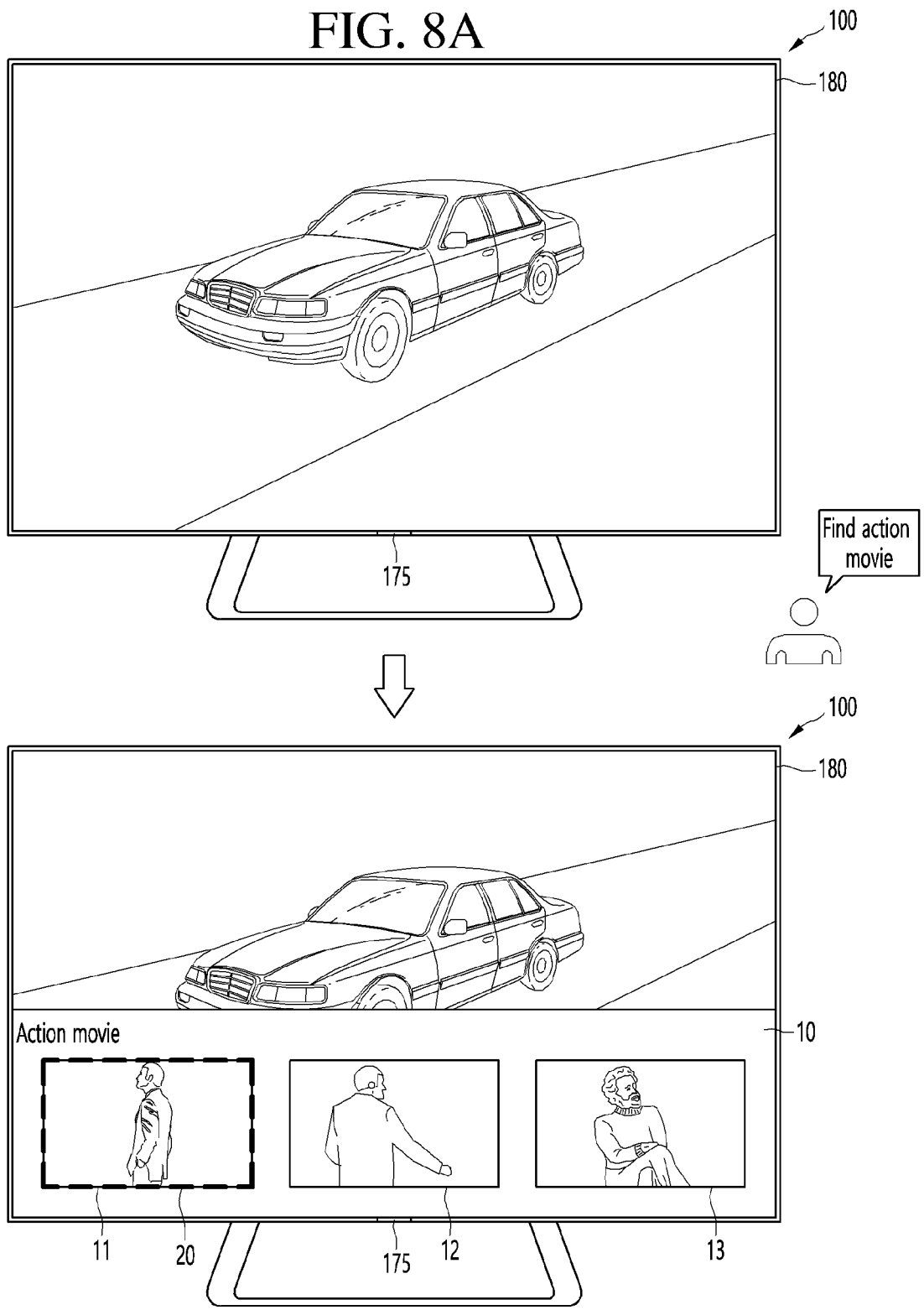

FIG. 8B
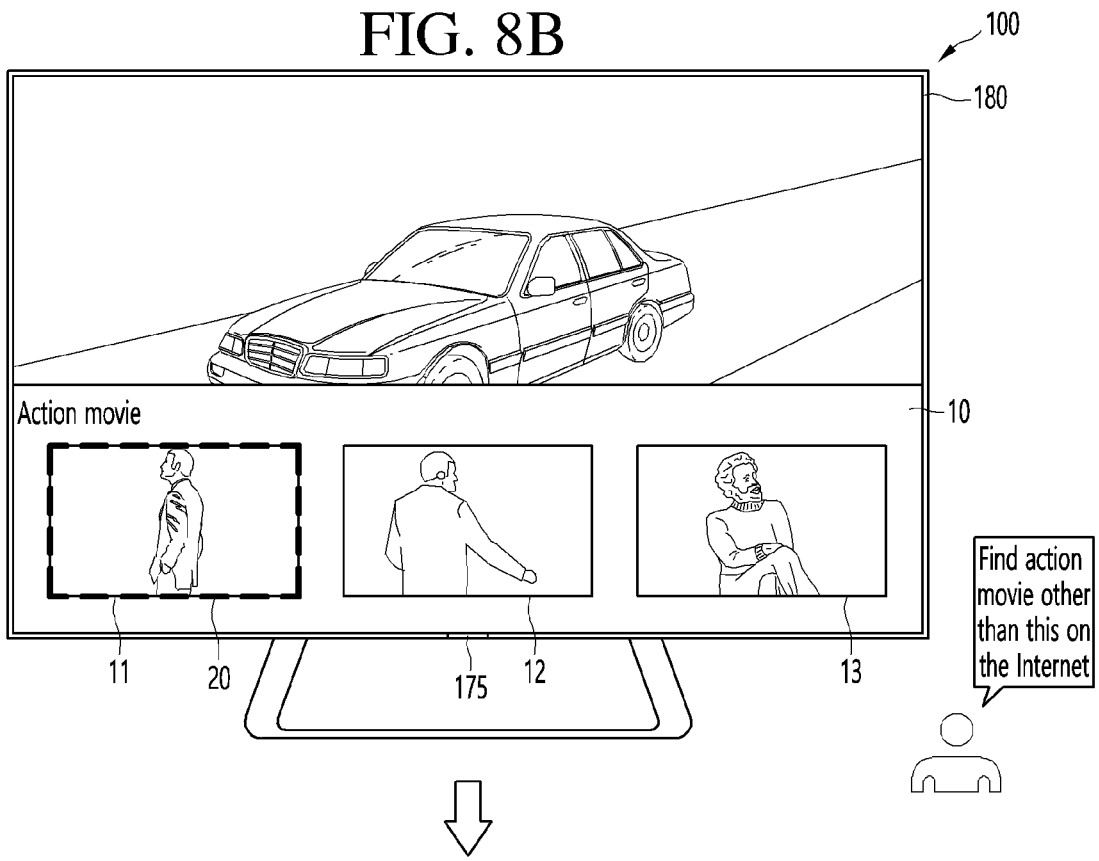
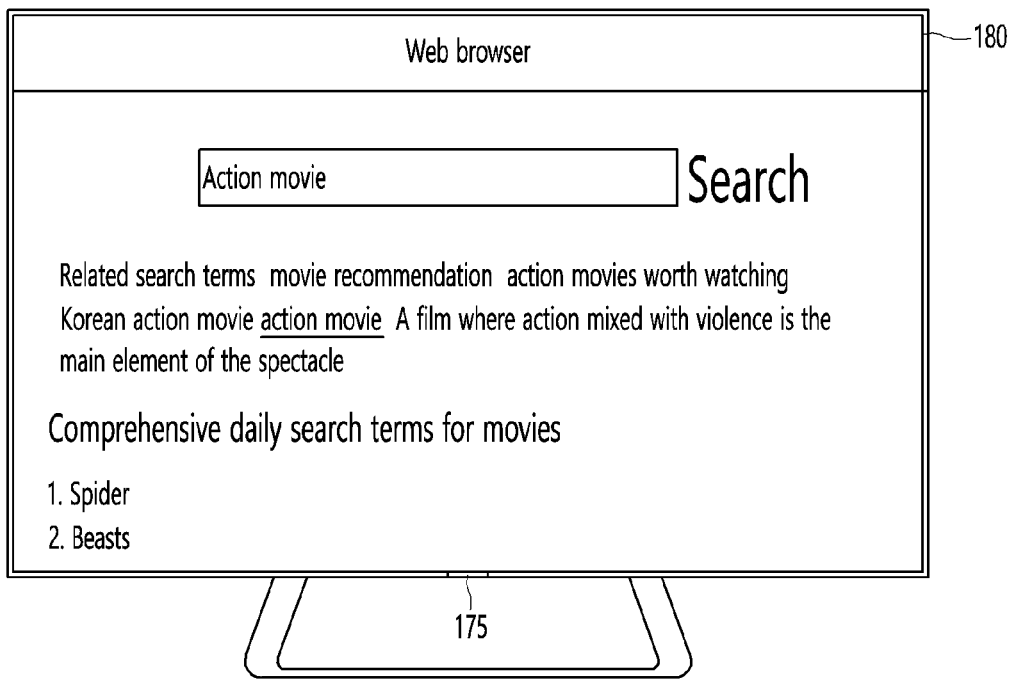

DISPLAY DEVICE AND OPERATION METHOD FOR SAME

CROSS-REFERENCE TO RELATED APPLICATIONS

This application is the National Stage filing under 35 U.S.C. 371 of International Application No. PCT/KR2019/009044, filed on Jul. 22, 2019, the contents of which are all incorporated by reference herein in its entirety.

TECHNICAL FIELD

The present disclosure relates to a display device and an operation method for the same, and more particularly, to a display device for receiving and processing a voice command, and an operation method for the same.

BACKGROUND ART

As voice recognition technology develops, a display device such as a TV recognizes a user's voice and provides a function corresponding thereto.

However, when several voice commands are continuously recognized, a conventional display device independently processes a plurality of voice commands. Thus, in many cases, an operation beyond a user's intention may occur.

In addition, there is a limitation in that, although different operations have to be performed according to a situation, the conventional display device has no choice but to perform the same operation with respect to the same voice command.

For the reasons described above, a user suffers from the inconvenience of having to use a remote control device to select a result after uttering a first command to a display device.

Therefore, there is a need for a method in which a display device continuously receives a user's voice commands and processes the continuously received voice commands according to a user's intention according to each situation.

DISCLOSURE OF INVENTION

Technical Problem

The present disclosure aims to provide a display device for continuously recognizing and processing voice commands, and an operation method for the same.

The present disclosure aims to provide a display device capable of more accurately recognizing a user's intended voice command regardless of ambient noise, and an operation method for the same.

Technical Solution

A display device according to an embodiment of present disclosure comprises a display, a voice acquisition module configured to recognize a voice, and a controller configured to, when acquiring a second voice command after acquiring a first voice command through the voice acquisition module, execute a function corresponding to the second voice command when the controller determines that the second voice command is a voice command connected to the first voice command.

When the controller determines that the second voice command is not the voice command connected to the first voice command, the controller is configured not to execute the function corresponding to the second voice command.

When the controller determines that the second voice command is not the voice command connected to the first voice command, the controller is configured to control the display to display a message indicating that the execution of the function corresponding to the second voice command is impossible.

When the controller acquires a voice command through the voice acquisition module, the controller is configured to acquire at least one of an execution context or a required context corresponding the acquired voice command.

The controller is configured to determine whether the second voice command is the voice command connected to the first voice command by comparing a required context of the first voice command with an execution context of the second voice command.

The controller is configured to determine the second voice command is the voice command connected to the first voice command when the execution context of the second voice command is included in the required context of the first voice command.

When the execution context of the second voice command is not included in the required context of the first voice command, the controller is configured to determine that the second voice command is a voice command not connected to the first voice command.

After the first voice command is acquired and before the second voice command is acquired, the controller is configured to extract at least one voice command determined as being connected to the first voice command.

When the second voice command corresponds to the voice command extracted as being connected to the first voice command, the controller is configured to execute the function corresponding to the second voice command.

The controller is configured to control the display to display the at least one voice command extracted as being connected to the first voice command.

The controller is configured to determine a voice command in which the execution context is a required context of the first voice command as being connected to the first voice command.

When the controller acquires a context switch command from the first voice command, the controller is configured to reset an execution condition context.

When the first voice command is different, the controller is configured to performs a different operation even when the second voice command is the same.

A method for operating a display device according to an embodiment of present disclosure comprises acquiring a first voice command, acquiring a second voice command, determining whether the second voice command is a voice command connected to the first voice command, and executing a function corresponding to the second voice command when it is determined that the second voice command is the voice command connected to the first voice command.

Advantageous Effects

According to an embodiment of the present disclosure, when a user receives a plurality of voice commands uttered continuously by a user, only the voice commands appropriate for a current situation can be recognized. Accordingly, there is an advantage in that the case of operating differently from the user's intention can be minimized.

In addition, there is an advantage in that it is possible to minimize the case of performing an unnecessary operation by erroneously recognizing ambient noise or a broadcast sound as a user's voice command when recognizing a continuous speech.

In addition, when the user continuously utters a plurality of voice commands to the display device, there is an advantage in that the display device can recognize the voice commands without continuously uttering the starting words unnecessarily.

BRIEF DESCRIPTION OF DRAWINGS

FIG. 6 is an exemplary view for describing a method by which the display devices acquires the execution context and the required context corresponding to the voice command according to an embodiment of the present disclosure.

FIG. 7A is an example showing a method by which the display device receives the first voice command, according to an embodiment of the present disclosure.

FIG. 7B is an example showing a method by which the display device receives the second voice command and performs an operation corresponding thereto, according to an embodiment of the present disclosure.

FIG. 8A is an example showing a method by which the display device receives the first voice command, according to an embodiment of the present disclosure.

FIG. 8B is an example showing a method by which the display device receives a context switch command and performs an operation corresponding thereto, according to an embodiment of the present disclosure.

BEST MODE FOR CARRYING OUT THE INVENTION

Hereinafter, embodiments relating to the present disclosure will be described in detail with reference to the accompanying drawings. The suffixes "module" and "interface" for components used in the description below are assigned or mixed in consideration of easiness in writing the specification and do not have distinctive meanings or roles by themselves.

Figure 1:
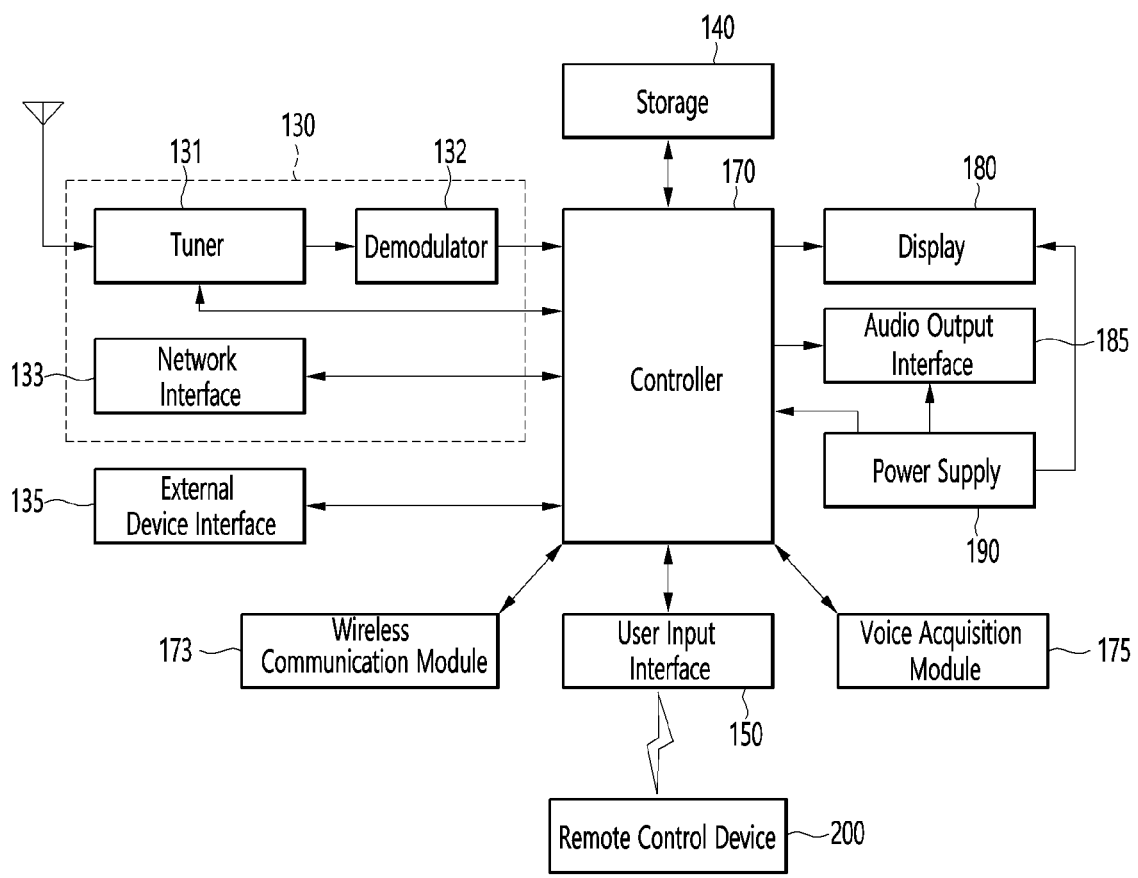
FIG. 1 is a block diagram illustrating a configuration of a display device according to an embodiment of the present disclosure.

FIG. 1 is a block diagram illustrating a configuration of a display device according to an embodiment of the present disclosure.

Referring to FIG. 1, a display device 100 can include a broadcast reception module 130, an external device interface 135, a storage 140, a user input interface 150, a controller 170, a wireless communication interface 173, a voice acquisition module 175, a display 180, an audio output interface 185, and a power supply 190.

The broadcast reception module 130 can include a tuner 131, a demodulator 132, and a network interface 133.

The tuner 131 can select a specific broadcast channel according to a channel selection command. The tuner 131 can receive broadcast signals for the selected specific broadcast channel.

The demodulator 132 can divide the received broadcast signals into video signals, audio signals, and broadcast program related data signals and restore the divided video signals, audio signals, and data signals to an output available form.

The network interface 133 can provide an interface for connecting the display device 100 to a wired/wireless network including internet network. The network interface 133 can transmit or receive data to or from another user or another electronic device through an accessed network or another network linked to the accessed network.

The network interface 133 can access a predetermined webpage through an accessed network or another network linked to the accessed network. That is, it can transmit or receive data to or from a corresponding server by accessing a predetermined webpage through network.

Then, the network interface 133 can receive contents or data provided from a content provider or a network operator. That is, the network interface 133 can receive contents such as movies, advertisements, games, VODs, and broadcast signals, which are provided from a content provider or a network provider, through network and information relating thereto.

Additionally, the network interface 133 can receive firmware update information and update files provided from a network operator and transmit data to an internet or content provider or a network operator.

The network interface 133 can select and receive a desired application among applications open to the air, through network.

The external device interface 135 can receive an application or an application list in an adjacent external device and deliver it to the controller 170 or the storage 140.

The external device interface 135 can provide a connection path between the display device 100 and an external device. The external device interface 135 can receive at least one of image and audio outputted from an external device that is wirelessly or wiredly connected to the display device 100 and deliver it to the controller. The external device interface 135 can include a plurality of external input terminals. The plurality of external input terminals can include an RGB terminal, at least one High Definition Multimedia Interface (HDMI) terminal, and a component terminal.

An image signal of an external device inputted through the external device interface 135 can be outputted through the display 180. A sound signal of an external device inputted through the external device interface 135 can be outputted through the audio output interface 185.

An external device connectable to the external device interface 135 can be one of a set-top box, a Blu-ray player, a DVD player, a game console, a sound bar, a smartphone, a PC, a USB memory, and a home theater system but this is just exemplary.

Additionally, some content data stored in the display device 100 can be transmitted to a user or an electronic device, which is selected from other users or other electronic devices pre-registered in the display device 100.

The storage 140 can store signal-processed image, voice, or data signals stored by a program in order for each signal processing and control in the controller 170.

Additionally, the storage 140 can perform a function for temporarily store image, voice, or data signals outputted from the external device interface 135 or the network interface 133 and can store information on a predetermined image through a channel memory function.

The storage 140 can store an application or an application list inputted from the external device interface 135 or the network interface 133.

The display device 100 can play content files (for example, video files, still image files, music files, document files, application files, and so on) stored in the storage 140 and provide them to a user.

The user input interface 150 can deliver signals inputted from a user to the controller 170 or deliver signals from the controller 170 to a user. For example, the user input interface 150 can receive or process control signals such as power on/off, channel selection, and screen setting from the remote control device 200 or transmit control signals from the controller 170 to the remote control device 200 according to various communication methods such as Bluetooth, Ultra Wideband (WB), ZigBee, Radio Frequency (RF), and IR.

Additionally, the user input interface 150 can deliver, to the controller 170, control signals inputted from local keys (not shown) such as a power key, a channel key, a volume key, and a setting key.

Image signals that are image-processed in the controller 170 can be inputted to the display 180 and displayed as an image corresponding to corresponding image signals. Additionally, image signals that are image-processed in the controller 170 can be inputted to an external output device through the external device interface 135.

Voice signals processed in the controller 170 can be outputted to the audio output interface 185. Additionally, voice signals processed in the controller 170 can be inputted to an external output device through the external device interface 135.

Besides that, the controller 170 can control overall operations in the display device 100.

Additionally, the controller 170 can control the display device 100 by a user command or internal program inputted through the user input interface 150 and download a desired application or application list into the display device 100 in access to network.

The controller 170 can output channel information selected by a user together with processed image or voice signals through the display 180 or the audio output interface 185.

Additionally, according to an external device image playback command received through the user input interface 150, the controller 170 can output image signals or voice signals of an external device such as a camera or a camcorder, which are inputted through the external device interface 135, through the display 180 or the audio output interface 185.

Moreover, the controller 170 can control the display 180 to display images and control broadcast images inputted through the tuner 131, external input images inputted through the external device interface 135, images inputted through the network interface, or images stored in the storage 140 to be displayed on the display 180. In this case, an image displayed on the display 180 can be a still image or video and also can be a 2D image or a 3D image.

Additionally, the controller 170 can play content stored in the display device 100, received broadcast content, and external input content inputted from the outside, and the content can be in various formats such as broadcast images, external input images, audio files, still images, accessed web screens, and document files.

Moreover, the wireless communication interface 173 can perform a wired or wireless communication with an external electronic device. The wireless communication interface 173 can perform short-range communication with an external device. For this, the wireless communication interface 173 can support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies. The wireless communication interface 173 can support wireless communication between the display device 100 and a wireless communication system, between the display device 100 and another display device 100, or between networks including the display device 100 and another display device 100 (or an external server) through wireless area networks. The wireless area networks can be wireless personal area networks.

Herein, the other display device 100 can be a mobile terminal such as a wearable device (for example, a smart watch, a smart glass, and a head mounted display (HMD)) or a smartphone, which is capable of exchanging data (or inter-working) with the display device 100. The wireless communication interface 173 can detect (or recognize) a communicable wearable device around the display device 100. Furthermore, if the detected wearable device is a device authenticated to communicate with the display device 100, the controller 170 can transmit at least part of data processed in the display device 100 to the wearable device through the wireless communication interface 173. Accordingly, a user of the wearable device can use the data processed in the display device 100 through the wearable device.

The voice acquisition module 175 can acquire audio. The voice acquisition module 175 may include at least one microphone (not shown), and can acquire audio around the display device 100 through the microphone (not shown).

The display 180 can convert image signals, data signals, or OSD signals, which are processed in the controller 170, or images signals or data signals, which are received in the external device interface 135, into R, G, and B signals to generate driving signals.

Furthermore, the display device 100 shown in FIG. 1 is just one embodiment of the present disclosure and thus, some of the components shown can be integrated, added, or omitted according to the specification of the actually implemented display device 100.

That is, if necessary, two or more components can be integrated into one component or one component can be divided into two or more components and configured. Additionally, a function performed by each block is to describe an embodiment of the present disclosure and its specific operation or device does not limit the scope of the present disclosure.

According to another embodiment of the present disclosure, unlike FIG. 1, the display device 100 can receive images through the network interface 133 or the external device interface 135 and play them without including the tuner 131 and the demodulator 132.

For example, the display device 100 can be divided into an image processing device such as a set-top box for receiving broadcast signals or contents according to various network services and a content playback device for playing contents inputted from the image processing device.

In this case, an operating method of a display device according to an embodiment of the present disclosure described below can be performed by one of the display device described with reference to FIG. 1, an image processing device such as the separated set-top box, and a content playback device including the display 180 and the audio output interface 185.

The audio output interface 185 receives the audio processed signal from the controller 170 and outputs the sound.

The power supply 190 supplies the corresponding power throughout the display device 100. In particular, the power supply 190 supplies power to the controller 170 that can be implemented in the form of a System On Chip (SOC), a display 180 for displaying an image, and the audio output interface 185 for outputting audio or the like.

Specifically, the power supply 190 may include a converter for converting an AC power source into a DC power source, and a DC/DC converter for converting a level of the DC source power.

Figure 2:
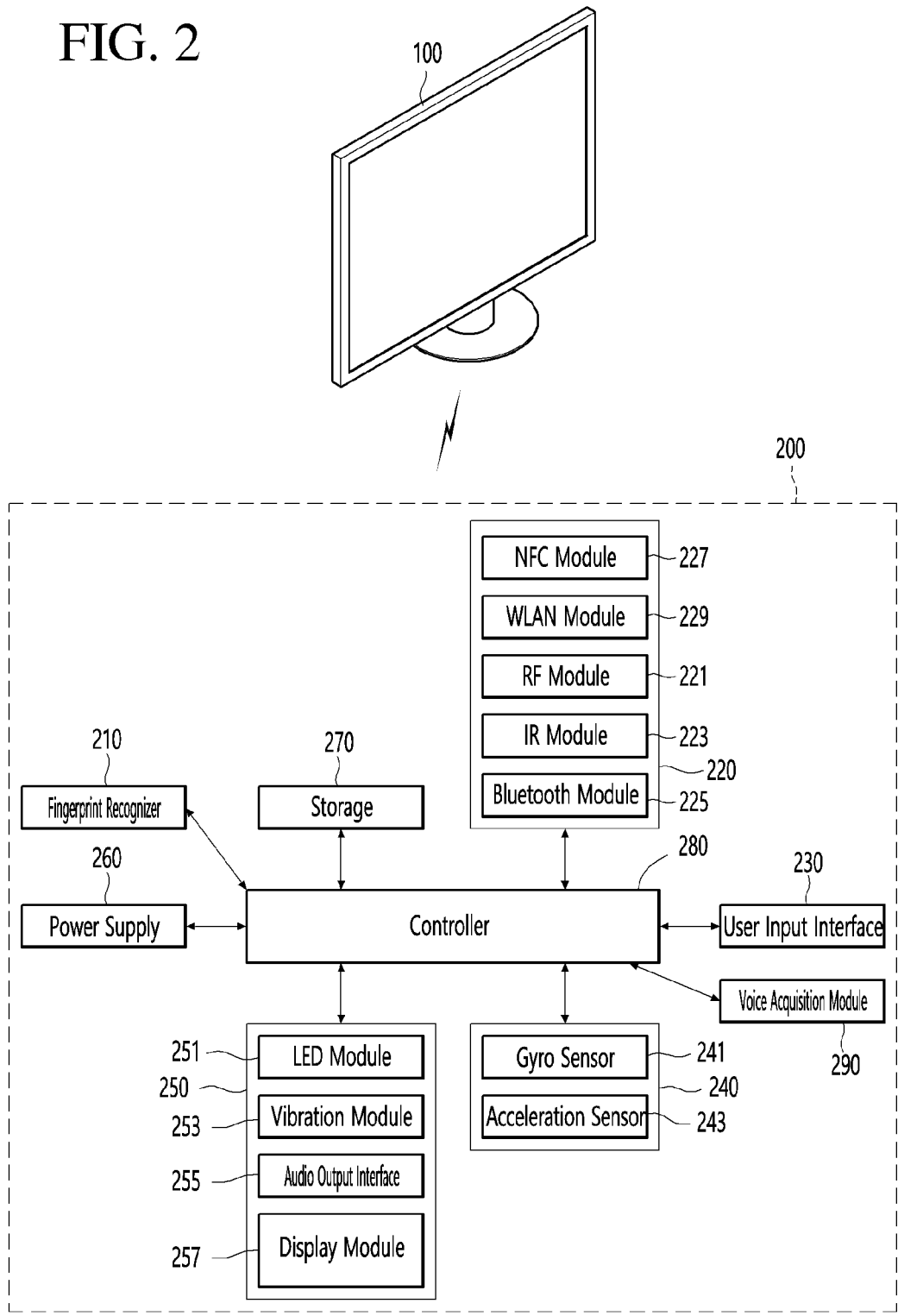
FIG. 2 is a block diagram of a remote control device according to an embodiment of the present disclosure.
Figure 3:
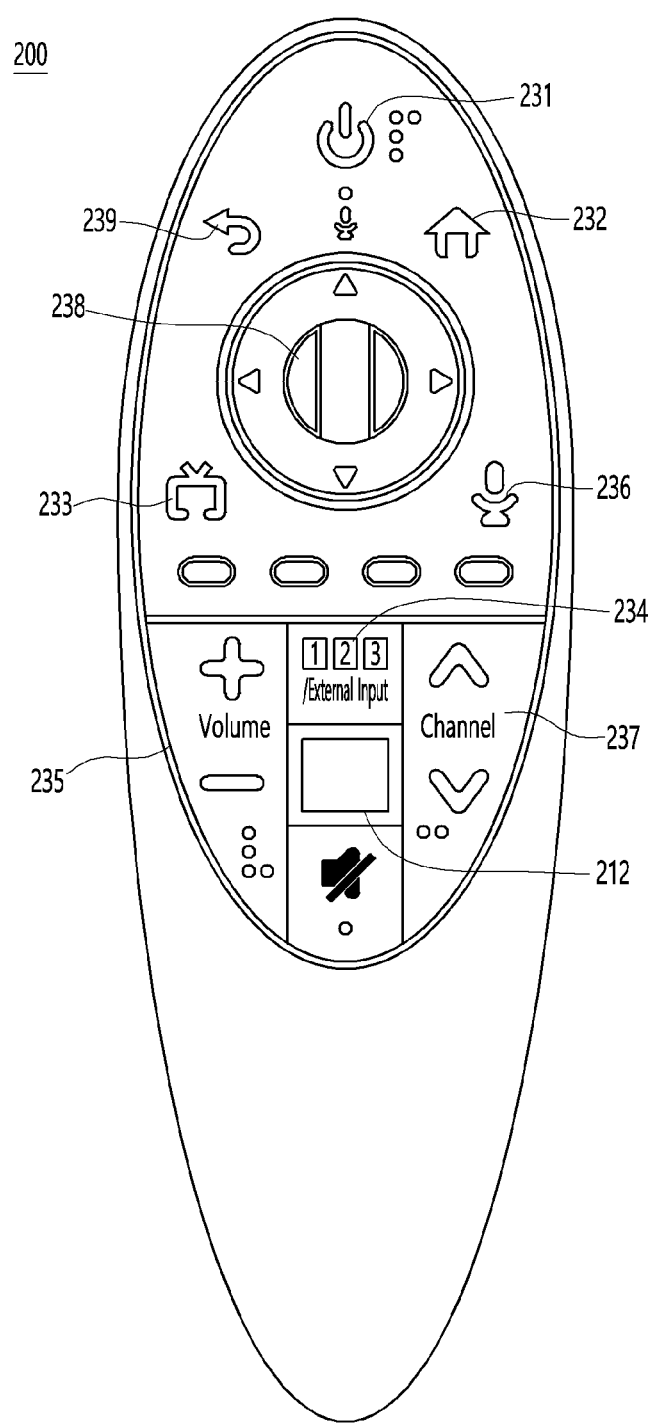
FIG. 3 shows an example of an actual configuration of a remote control device according to an embodiment of the present disclosure.

Then, referring to FIGS. 2 and 3, a remote control device is described according to an embodiment of the present disclosure.

FIG. 2 is a block diagram illustrating a remote control device according to an embodiment of the present disclosure and FIG. 3 is a view illustrating an actual configuration of a remote control device according to an embodiment of the present disclosure.

First, referring to FIG. 2, a remote control device 200 can include a fingerprint recognition module 210, a wireless communication interface 220, a user input interface 230, a sensor 240, an output interface 250, a power supply 260, a storage 270, a controller 280, and a voice acquisition module 290.

Referring to FIG. 2, the wireless communication interface 220 transmits/receives signals to/from any arbitrary one of display devices according to the above-mentioned embodiments of the present disclosure.

The remote control device 200 can include an RF module 221 for transmitting/receiving signals to/from the display device 100 according to the RF communication standards and an IR module 223 for transmitting/receiving signals to/from the display device 100 according to the IR communication standards. Additionally, the remote control device 200 can include a Bluetooth module 225 for transmitting/receiving signals to/from the display device 100 according to the Bluetooth communication standards. Additionally, the remote control device 200 can include an NFC module 227 for transmitting/receiving signals to/from the display device 100 according to the Near Field Communication (NFC) communication standards and a WLAN module 229 for transmitting/receiving signals to/from the display device 100 according to the Wireless LAN (WLAN) communication standards Additionally, the remote control device 200 can transmit signals containing information on a movement of the remote control device 200 to the display device 100 through the wireless communication interface 220.

Moreover, the remote control device 200 can receive signals transmitted from the display device 100 through the RF module 221 and if necessary, can transmit a command on power on/off, channel change, and volume change to the display device 100 through the IR module 223.

The user input interface 230 can be configured with a keypad button, a touch pad, or a touch screen. A user can manipulate the user input interface 230 to input a command relating to the display device 100 to the remote control device 200. If the user input interface 230 includes a hard key button, a user can input a command relating to the display device 100 to the remote control device 200 through the push operation of the hard key button. This will be described with reference to FIG. 3.

Referring to FIG. 3, the remote control device 200 can include a plurality of buttons. The plurality of buttons can include a fingerprint recognition button 212, a power button 231, a home button 232, a live button 233, an external input button 234, a voice adjustment button 235, a voice recognition button 236, a channel change button 237, a check button 238, and a back button 239.

The fingerprint recognition button 212 can be a button for recognizing a user's fingerprint. According to an embodiment of the present disclosure, the fingerprint recognition button 212 can perform a push operation and receive a push operation and a fingerprint recognition operation. The power button 231 can be button for turning on/off the power of the display device 100. The power button 231 can be button for moving to the home screen of the display device 100. The live button 233 can be a button for displaying live broadcast programs. The external input button 234 can be button for receiving an external input connected to the display device 100. The voice adjustment button 235 can be button for adjusting the size of a volume outputted from the display device 100. The voice recognition button 236 can be a button for receiving user's voice and recognizing the received voice. The channel change button 237 can be a button for receiving broadcast signals of a specific broadcast channel. The check button 238 can be a button for selecting a specific function and the back button 239 can be a button for returning to a previous screen.

Again, FIG. 2 is described.

If the user input interface 230 includes a touch screen, a user can touch a soft key of the touch screen to input a command relating to the display device 100 to the remote control device 200. Additionally, the user input interface 230 can include various kinds of input means manipulated by a user, for example, a scroll key and a jog key, and this embodiment does not limit the scope of the present disclosure.

The sensor 240 can include a gyro sensor 241 or an acceleration sensor 243 and the gyro sensor 241 can sense information on a movement of the remote control device 200.

For example, the gyro sensor 241 can sense information on an operation of the remote control device 200 on the basis of x, y, and z axes and the acceleration sensor 243 can sense information on a movement speed of the remote control device 200. Moreover, the remote control device 200 can further include a distance measurement sensor and sense a distance with respect to the display 180 of the display device 100.

The output interface 250 can output image or voice signals corresponding to a manipulation of the user input interface 230 or corresponding to signals transmitted from the display device 100. A user can recognize whether the user input interface 230 is manipulated or the display device 100 is controlled through the output interface 250.

For example, the output interface 250 can include an LED module 251 for flashing, a vibration module 253 for generating vibration, a sound output module 255 for outputting sound, or a display module 257 for outputting an image, if the user input interface 230 is manipulated or signals are transmitted/received to/from the display device 100 through the wireless communication interface 220.

Additionally, the power supply 260 supplies power to the remote control device 200 and if the remote control device 200 does not move for a predetermined time, stops the power supply, so that power waste can be reduced. The power supply 260 can resume the power supply if a predetermined key provided at the remote control device 200 is manipulated.

The storage 270 can store various kinds of programs and application data necessary for a control or operation of the remote control device 200. If the remote control device 200 transmits/receives signals wirelessly through the display device 100 and the RF module 221, the remote control device 200 and the display device 100 transmits/receives signals through a predetermined frequency band.

The controller 280 of the remote control device 200 can store, in the storage 270, information on a frequency band for transmitting/receiving signals to/from the display device 100 paired with the remote control device 200 and refer to it.

The controller 280 controls general matters relating to a control of the remote control device 200. The controller 280 can transmit a signal corresponding to a predetermined key manipulation of the user input interface 230 or a signal corresponding to a movement of the remote control device 200 sensed by the sensor 240 to the display device 100 through the wireless communication interface 220.

Additionally, the voice acquisition module 290 of the remote control device 200 can obtain voice.

The voice acquisition module 290 can include at least one microphone 291 and obtain voice through the microphone 291.

Figure 4:
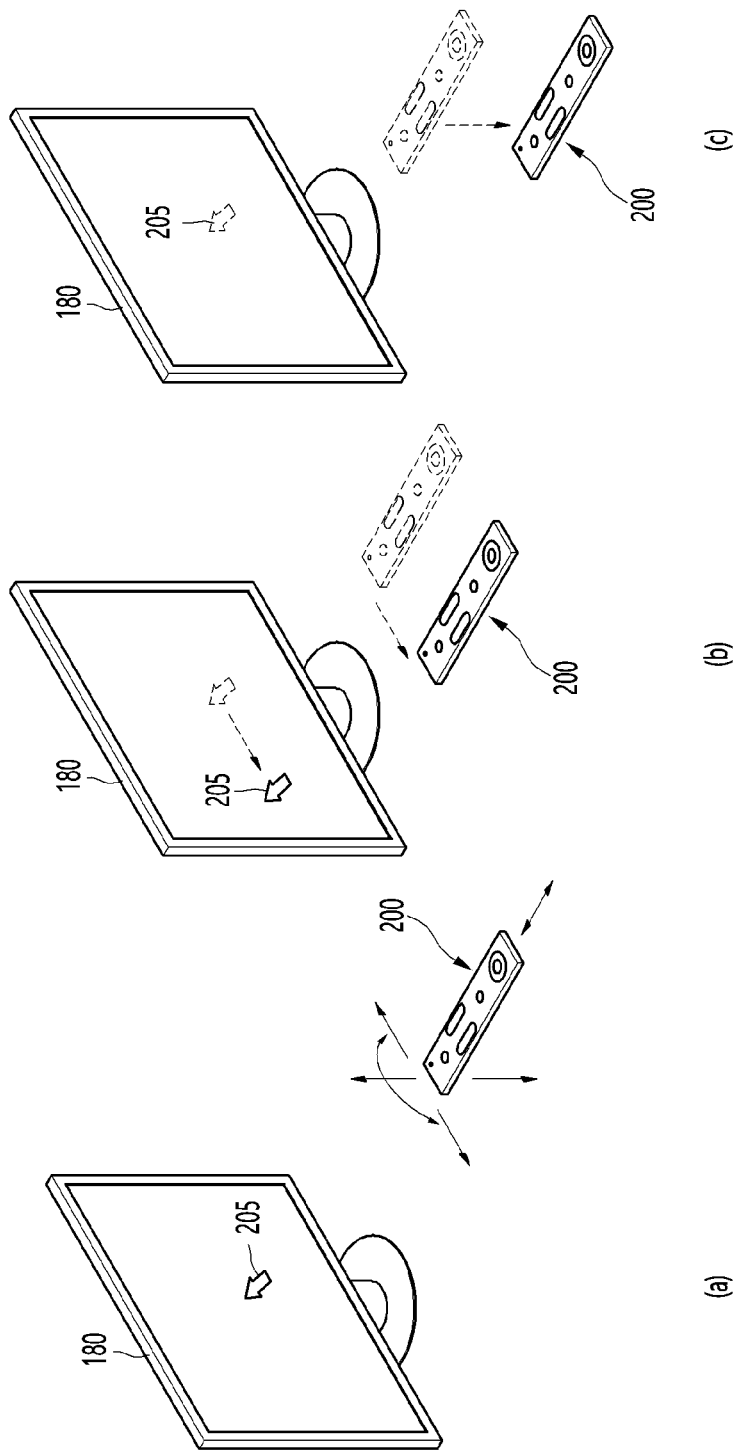
FIG. 4 shows an example of using a remote control device according to an embodiment of the present disclosure.

Then, FIG. 4 is described.

FIG. 4 is a view of utilizing a remote control device according to an embodiment of the present disclosure.

FIG. 4A illustrates that a pointer 205 corresponding to the remote control device 200 is displayed on the display 180.

A user can move or rotate the remote control device 200 vertically or horizontally. The pointer 205 displayed on the display 180 of the display device 100 corresponds to a movement of the remote control device 200. Since the corresponding pointer 205 is moved and displayed according to a movement on a 3D space as show in the drawing, the remote control device 200 can be referred to as a spatial remote controller.

FIG. 4B illustrates that if a user moves the remote control device 200, the pointer 205 displayed on the display 180 of the display device 100 is moved to the left in correspondence thereto.

Information on a movement of the remote control device 200 detected through a sensor of the remote control device 200 is transmitted to the display device 100. The display device 100 can calculate the coordinates of the pointer 205 from the information on the movement of the remote control device 200. The display device 100 can display the pointer 205 to match the calculated coordinates.

FIG. 4C illustrates that while a specific button in the remote control device 200 is pressed, a user moves the remote control device 200 away from the display 180. Thus, a selection area in the display 180 corresponding to the pointer 205 can be zoomed in and displayed largely.

On the other hand, if a user moves the remote control device 200 close to the display 180, a selection area in the display 180 corresponding to the pointer 205 can be zoomed out and displayed reduced.

On the other hand, if the remote control device 200 is away from the display 180, a selection area can be zoomed out and if the remote control device 200 is close to the display 180, a selection area can be zoomed in.

Additionally, if a specific button in the remote control device 200 is pressed, the recognition of a vertical or horizontal movement can be excluded. That is, if the remote control device 200 is moved away from or close to the display 180, the up, down, left, or right movement cannot be recognized and only the back and forth movement can be recognized. While a specific button in the remote control device 200 is not pressed, only the pointer 205 is moved according to the up, down, left or right movement of the remote control device 200.

Moreover, the moving speed or moving direction of the pointer 205 can correspond to the moving speed or moving direction of the remote control device 200.

Furthermore, a pointer in this specification means an object displayed on the display 180 in correspondence to an operation of the remote control device 200. Accordingly, besides an arrow form displayed as the pointer 205 in the drawing, various forms of objects are possible. For example, the above concept includes a point, a cursor, a prompt, and a thick outline. Then, the pointer 205 can be displayed in correspondence to one point of a horizontal axis and a vertical axis on the display 180 and also can be displayed in correspondence to a plurality of points such as a line and a surface.

Figure 5:
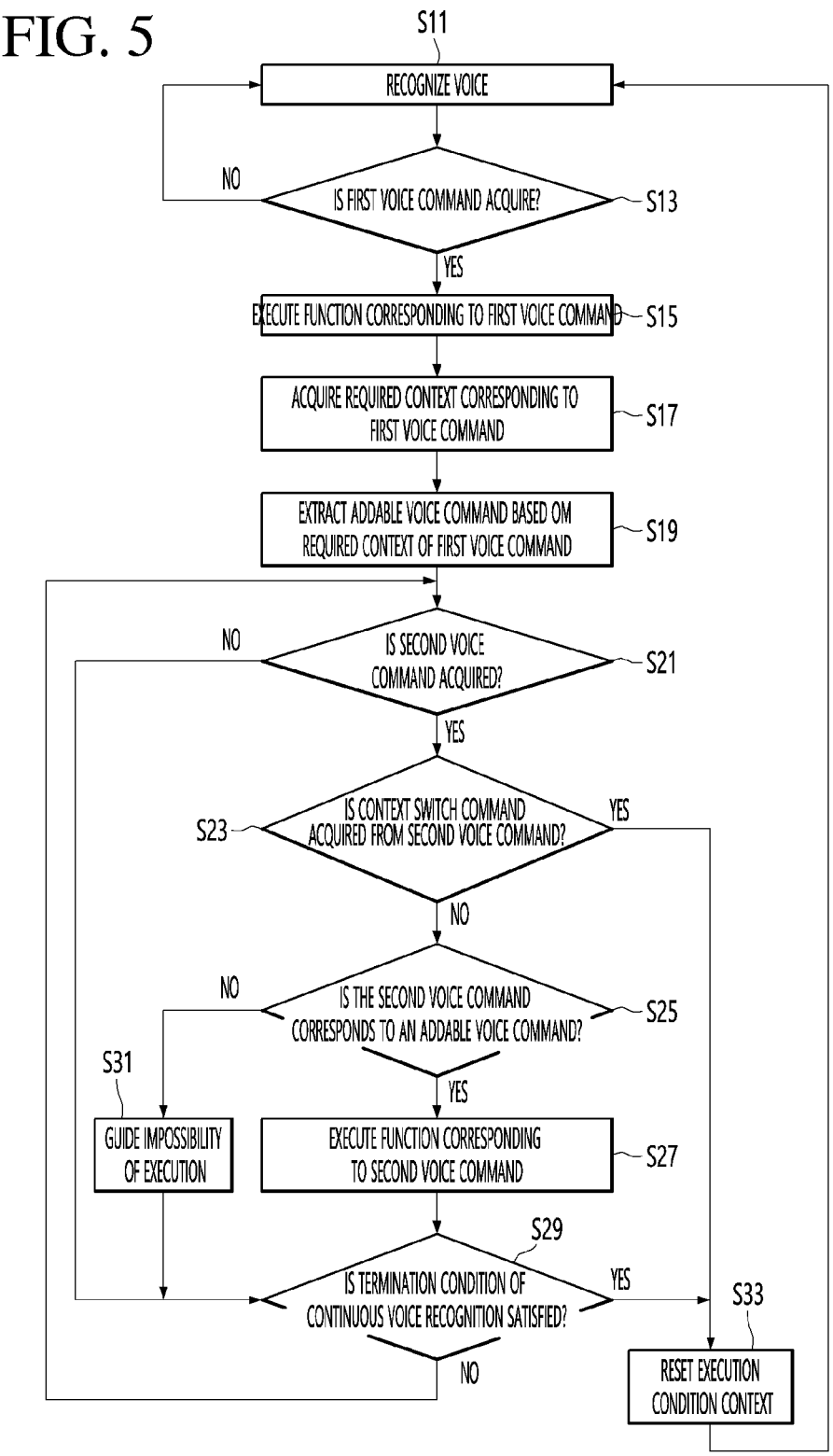
FIG. 5 is a flowchart illustrating a method for operating a display device according to an embodiment of the present disclosure.

FIG. 5 is a flowchart illustrating a method for operating a display device according to an embodiment of the present disclosure.

The voice acquisition module 175 can recognize a voice (S11).

The controller 170 can control the voice acquisition module 175 to recognize a user's voice.

The voice acquisition module 175 can also recognize a user's voice from a relatively distant location.

The controller 170 can determine whether a first voice command is acquired (S13).

The controller 170 can acquire the first voice command based on the voice recognized by the voice acquisition module 175.

The first voice command may be an initial voice command in a continuous speech mode. That is, the controller 170 can execute the continuous speech mode according to the recognition of the first voice command, and can regard the first voice command as the first voice command in the continuous speech mode. The first voice command can be a voice command according to a first speech.

According to an embodiment, when the continuous speech mode is executed, the controller 170 can control the display 180 to further display an icon indicating that the continuous speech mode is being executed.

According to an embodiment, the controller 170 can acquire the first voice command by recognizing a trigger word from the voice recognized through the voice acquisition module 175.

The trigger word can be a starting word for inputting the voice command to the display device 100. The trigger word can be preset. For example, the trigger word can be 'Hi, LG', but this is only an example and the present disclosure is not limited thereto.

When recognizing the trigger word, the controller 170 can acquire the voice recognized after the trigger word as the first voice command.

On the other hand, the controller 170 can acquire the first voice command through a method other than the trigger word.

When the controller 170 fails to acquire the first voice command, the voice acquisition module 175 can continue to recognize the voice.

When the first voice command is acquired, the controller 170 can execute a function corresponding to the first voice command (S15).

For example, the first voice command can be 'Find . . . ', 'Change the channel to . . . ', 'Change the volume to . . . ', 'Show . . . ', etc. In this case, the controller 170 can execute the function corresponding to the first voice command.

However, as another example, the first voice command can be 'right' or 'down'. In this case, the controller 170 cannot execute the function corresponding to the first voice command.

The controller 170 can acquire a required context corresponding to the first voice command (S17).

When the voice command is acquired through the voice acquisition module 175, the controller 170 can acquire at least one of an execution context or a required context corresponding to the acquired voice command.

In particular, when the first voice command is acquired, the controller 170 can acquire the required context corresponding to the first voice command. In addition, when a second voice command to be described below is acquired, the controller 170 can acquire an execution context corresponding to the second voice command. However, this is only an example, and the controller 170 can also acquire an execution context corresponding to the first voice command and a required context corresponding to the second voice command. That is, according to an embodiment, the controller 170 can acquire the execution context and the required context corresponding to the first voice command, and can acquire the execution context and the required context corresponding to the second voice command.

The required context can refer to a condition context for determining whether to operate according to the received voice command when the display device 100 receives a next voice command.

The controller 170 can set the required context corresponding to the first voice command as an execution condition context.

The execution condition context can refer to a condition context for determining whether to execute the second voice command.

For example, when the required context corresponding to the first voice command is navigation and contents, the controller 170 can set navigation and contents as the execution condition context. When the voice command whose execution context is navigation or contents is received after the first voice command is received, the controller 170 can operate according to the received voice command.

On the other hand, the execution context can be a context mapped according to the voice command. The execution context can be a context for determining whether to execute the voice command.

Next, the execution context and the required context corresponding to the voice command, according to an embodiment of the present disclosure, will be described in detail with reference to FIG. 6.

FIG. 6 is an exemplary view for describing a method by which the display devices acquires the execution context and the required context corresponding to the voice command according to an embodiment of the present disclosure.

The storage 140 can store continuous speech recognition data. The continuous speech recognition data can refer to data stored and managed to perform an operation according to a voice command according to a user's intention when the voice command is continuously received.

According to a first embodiment, the storage 140 can store a table shown in FIG. 6 as the continuous speech recognition data.

According to the first embodiment, the continuous speech recognition data can be a table in which execution contexts and required contexts for a plurality of voice commands are mapped.

At least one execution context and at least one required context can be mapped to one voice command.

Referring to the example of FIG. 6, 'searching' and 'contents' are mapped to the execution context corresponding to the voice command "Find an action movie", and 'navigation' and 'contents' are mapped as the required context corresponding to "Find an action movie". 'navigation' and 'scroll' are mapped to the execution context corresponding to the voice command "right", and 'navigation' and 'scroll' are mapped as required contexts corresponding to "right". 'searching' and 'web' are mapped as the execution context corresponding to the voice command "Find oo on the Internet", and 'searching' and 'scroll' are mapped as the required context corresponding to "Find oo on the Internet". 'navigation' and 'channel' are mapped to the execution context corresponding to the voice command "Channel up", and 'navigation' and 'channel' are mapped as the required context corresponding to "Channel Up". 'channel' is mapped to the execution context corresponding to the voice command "Play channel 10", and 'channel' is mapped as the required context corresponding to "Play channel 10". 'scroll' is mapped to the execution context corresponding to the voice command "down", and 'contents' and 'scroll' are mapped as the required context corresponding to "down".

In this case, when the controller 170 receives the voice command, the controller 170 can acquire the execution context and the required context corresponding to the voice command by extracting the execution context and the required context mapped to the received voice command from the table stored in the storage 140.

According to a second embodiment, the controller 170 can acquire the execution context and the required context based on each word included in the voice command.

According to the second embodiment, the storage 140 can store continuous speech recognition data including data in which the execution context is mapped for each word or letter and data in which the required context is mapped according to the execution context.

In this case, the continuous speech recognition data can have data in which the required context is mapped in consideration of the order of the execution contexts, so that, even if the execution contexts are the same, the required contexts are set differently according to the order of the execution contexts.

In addition, if there are a plurality of execution contexts, the continuous speech recognition data can have data in which the required context is mapped according to a combination of the execution contexts, so that the required context is set according to a combination of the plurality of execution contexts.

Referring to the example of FIG. 6, when "Find an action movie" is received as the voice command, the controller 170 can acquire the first execution context based on the 'action movie' and can acquire the second execution context based on 'searching' and 'find' as 'contents'. The controller 170 can acquire 'navigation' according to the first execution context 'searching' and 'contents' according to the second execution context 'contents' as the required context. Alternatively, the controller 170 can set the required context to 'navigation' and 'contents' according to a combination of the first execution context and the second execution context, that is, 'searching' and 'contents'.

An execution context and a required context can be extracted in the same manner for the remaining voice commands, and a description thereof will be omitted.

On the other hand, FIG. 6 shows that there are two execution contexts and one or two required contexts, but this is only given as an example for convenience of description. That is, each of the execution context and the required context is not limited to the number thereof.

As such, when the execution context and the required context are set according to the voice command, the display device 100 has an advantage of being able to perform an operation according to a situation. That is, when the first voice command is different, the display device 100 can perform different operations even if the second voice command to be described below is the same. In this manner, the display device 100 can perform an operation suitable for a current situation.

Again, FIG. 5 is described.

The controller 170 can extract an addable voice command based on the required context of the first voice command (S19).

When the first voice command is acquired, the controller 170 can extract at least one voice command determined as being connected to the first voice command. In particular, after the first voice command is acquired and before the second voice command is acquired, the controller 170 can extract at least one voice command determined as being connected to the first voice command.

The controller 170 can determine the required context of the first voice command as connecting the voice command having the execution context to the first voice command. That is, the controller 170 can extract the voice command, in which at least one of the execution contexts is the same as the required context of the first voice command, as the voice command connected to the first voice command.

Referring to the example of FIG. 6, when "Find an action movie" is acquired as the first voice command, the controller 170 can acquire 'navigation' and 'contents' as the required context corresponding to the first voice command. In this case, the controller 170 can extract "right" and "channel up", which have 'navigation' or 'contents' as the execution context, as the voice command connected to the first voice command.

According to an embodiment, the controller 170 can control the display 180 to display at least one voice command extracted as being connected to the first voice command. In this case, the display device 100 has an advantage of guiding a recognizable voice command to the user.

Again, FIG. 5 is described.

The controller 170 can determine whether the second voice command is acquired (S21).

The controller 170 can acquire the second voice command through the voice acquisition module 175.

The second voice command can be a voice command acquired after the first voice command in the continuous speech mode. That is, the controller 170 can regard the voice command recognized after acquiring the first voice command as the second voice command. The second voice command is a voice command acquired after the first utterance, and can be a voice command according to the second utterance.

According to an embodiment, the controller 170 can recognize the voice command obtained after acquiring the first voice command as the second voice command. Therefore, in this case, the controller 170 can acquire the second voice command regardless of the trigger word. That is, the controller 170 can acquire the first voice command through the trigger word, and after acquiring the first voice command, the controller 170 can acquire all voice commands recognized after the first voice command as the second voice command regardless of the trigger word.

When the second voice command is not acquired, the controller 170 can determine whether a termination condition of the continuous voice recognition is satisfied (S29). Operation S29 will be described in detail below.

When acquiring the second voice command, the controller 170 can determine whether a context switch command is acquired from the second voice command (S23).

That is, by determining whether the second voice command includes the context switch command, the controller 170 can determine whether the context switch command is acquire from the second voice command.

The context switch command can be a command for releasing a restriction on a voice command so that a voice command that is not continuous to the first voice command is also processed after the reception of the first voice command. After checking the result according to the first voice command, the user can be curious about other results. In this case, the user can utter another voice command having low relevance to the first voice command. This voice command can be referred to as a context switch command.

For example, the context switch command can include preset keywords such as 'other than this', 'excluding this', and 'other'.

As another example, the context switch command can include a trigger word.

On the other hand, according to an embodiment, operation S23 of determining whether the context switch command is acquired can be omitted. In this case, when the second voice command is received, the controller 170 can determine only whether the second voice command is the voice command connected to the first voice command. When the second voice command is the voice command connected to the first voice command, the controller 170 can perform a function corresponding to the second voice command.

Therefore, when the second voice command includes the context switch command, the controller 170 can reset the execution condition context (S33).

The controller 170 can reset the set execution condition context upon receiving the first voice command.

In this case, the controller 170 can receive the first voice command again.

On the other hand, when the second voice command fails to acquire the context switch command, the controller 170 can determine whether the second voice command corresponds to an addable voice command (S25).

Specifically, the controller 170 can acquire whether the second voice command corresponds to an addable voice command.

The addable voice command can refer to the voice command acquired in operation S19.

The controller 170 can determine whether the second voice command is the voice command connected to the first voice command by comparing the required context of the first voice command with the context of the second voice command. When the execution context of the second voice command is included in the required context of the first voice command, the controller 170 can determine that the second voice command is the voice command connected to the first voice command. On the other hand, when the execution context of the second voice command is not included in the required context of the first voice command, the controller 170 can determine that the second voice command is the voice command not connected to the first voice command.

When the second voice command corresponds to the addable voice command, the controller 170 can execute a function corresponding to the second voice command (S27).

That is, when acquiring the second voice command after acquiring the first voice command through the voice acquisition module 175, the controller 170 can determine whether the second voice command is the voice command connected to the first voice command. When the controller 170 determines that the second voice command is the voice command connected to the first voice command, the controller 170 can execute a function corresponding to the second voice command.

On the other hand, when the second voice command does not correspond to the addable voice command, the controller 170 can guide impossibility of execution (S31).

That is, when the controller 170 determines that the second voice command is not the voice command connected to the first voice command, the controller 170 can control the display 180 to display a message indicating that the execution of the function corresponding to the second voice command is impossible.

When the controller 170 determines that the second voice command is not the voice command connected to the first voice command, the controller 170 may not execute a function corresponding to the second voice command.

According to the present disclosure, the display device 100 can recognize only the voice command related to the first voice command by considering the situation according to the first voice command. That is, according to the present disclosure, the display device 100 does not recognize the voice command that is not related to the first voice command after the first voice command is received. Thus, there is an advantage in that it is possible to minimize the case of performing an operation unintended by the user due to ambient noise or broadcast sound.

The controller 170 can execute the function corresponding to the second voice command or display the message indicating that the execution is impossible, and then, can determine whether the termination condition of the continuous voice recognition is satisfied (S29).

The termination condition of the continuous voice recognition can refer to a condition for terminating the continuous speech mode executed according to the first voice command.

For example, the termination condition of the continuous voice recognition can include a case where an addable voice command is not received for a preset time.

When the addable voice command is not received for a preset time, the controller 170 can determine that the termination condition of the continuous voice recognition is satisfied.

In addition, the termination condition of the continuous voice recognition can include a case where there is no function to be additionally executed in relation to the first and second voice commands after the execution of the function corresponding to the second voice command.

When it is determined that the termination condition of the continuous speech recognition is satisfied, the controller 170 can reset the execution condition context (S33).

On the other hand, when the controller 170 determines that the termination condition of the continuous voice recognition is not satisfied, the controller 170 can continuously acquire the second voice command.

Next, a method for operating the display device 100 according to an embodiment of the present disclosure will be described with reference to the examples shown in FIGS. 7A to 7C and 8A to 8C.

FIG. 7A is an example showing a method by which the display device receives the first voice command, according to an embodiment of the present disclosure.

The controller 170 can acquire "Find an action movie" as the first voice command through the voice acquisition module 175.

The controller 170 can display the execution result of the function corresponding to the first voice command. In the example of FIG. 7A, the execution result of the function corresponding to the first voice command can be action movie search result information 10. The action movie search result information 10 can include a plurality of action movie items 11, 12, and 13. The action movie search result information 10 can further include an indicator 20 for selecting one of the action movie items 11, 12, and 13.

When the display device 100 does not provide the continuous speech mode, the user checks the action movie search result information 10 through the first voice command, and may have to use the remote control device 200 to select one of the action movie items 11, 12, and 13.

However, since the display device 100 according to an embodiment of the present disclosure provides the continuous speech mode, the user can utter a second voice command to select one of the action movie items 11, 12, and 13 after checking the action movie search result information 10 through the first voice command.

FIG. 7B is an example showing a method by which the display device receives the second voice command and performs an operation corresponding thereto, according to an embodiment of the present disclosure.

The controller 170 can acquire "right" as the second voice command in a state in which the action movie search result information 10 including the action movie items 11, 12, and 13 is displayed.

The controller 170 can analyze whether "right" is a voice command connected to the first voice command "Find an action movie". Since the required context of the first voice command "Find an action movie" is navigation/contents and the execution context of the second voice command "right" is navigation and scroll, the controller 170 can determine that the second voice command is the voice command connected to the first voice command.

Therefore, the controller 170 can determine that the second voice command "right" corresponds to the addable voice command, and can execute the function corresponding to the second voice command. That is, the controller 170 can execute a function of moving the indicator 20 from the first action movie item 11 to the second action movie item 12.

Figure 7C:
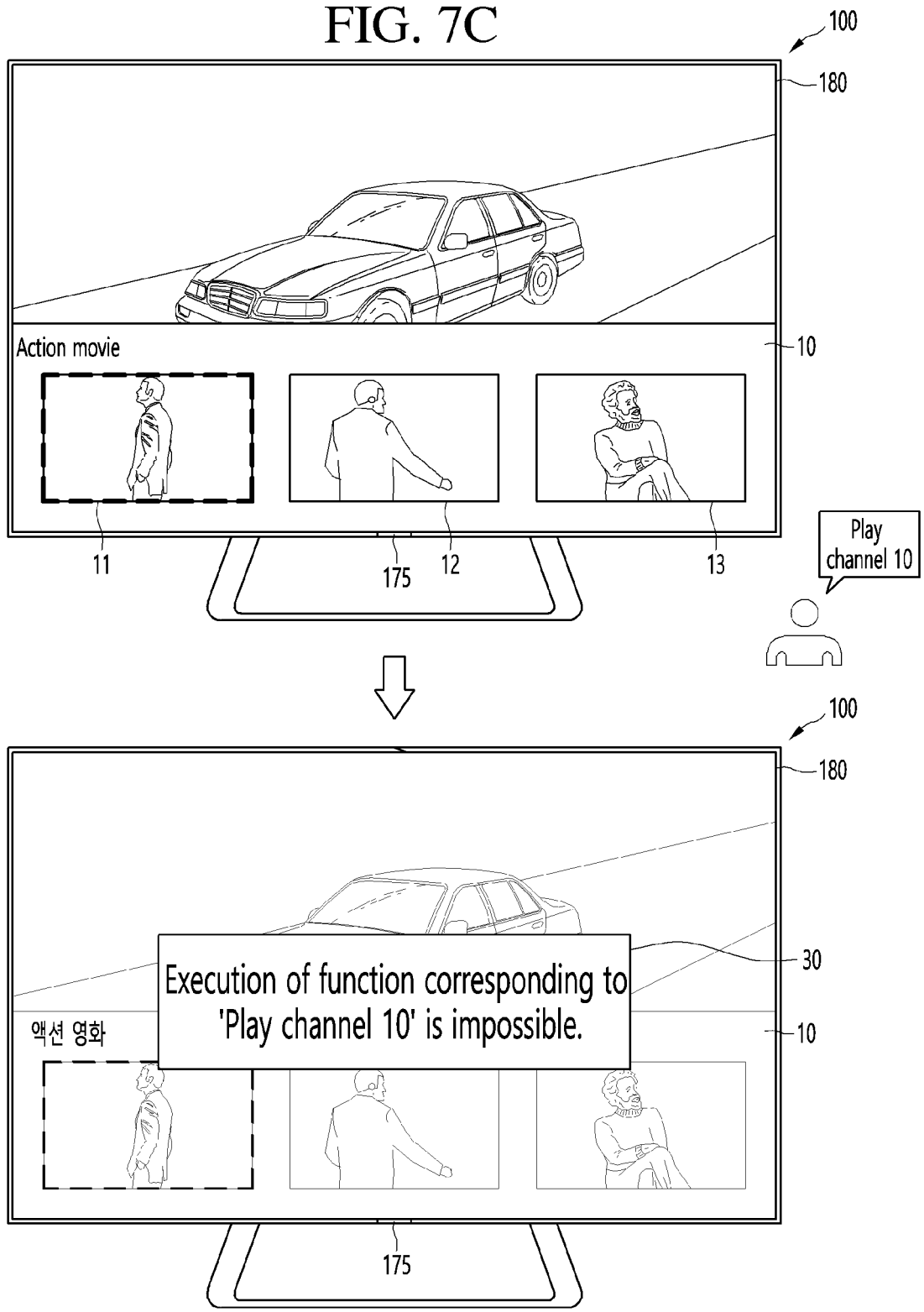
FIG. 7C is an example showing a method by which the display device guides the impossibility of reception and execution of the second voice command, according to an embodiment of the present disclosure.

FIG. 7C is an example showing a method by which the display device guides the impossibility of reception and execution of the second voice command, according to an embodiment of the present disclosure.

On the other hand, as shown in FIG. 7A, the controller 170 can acquire "Play channel 10" as the second voice command in a state in which the action movie search result information 10 including the action movie items 11, 12, and 13 is displayed.

The controller 170 can analyze whether "Play channel 10" is a voice command connected to the first voice command "Find an action movie". Since the required context of the first voice command "Find an action movie" is navigation/contents and the execution context of the second voice command "Play channel 10" is channel, the controller 170 can determine that the second voice command is not the voice command connected to the first voice command. That is, since the channel that is the execution context of the second voice command does not belong to the required context of the first voice command, the controller 170 can determine that the second voice command is not the voice command that is continuous to the first voice command.

Therefore, the controller 170 may not execute a function corresponding to "Play channel 10".

The controller 170 can control the display 180 to display a message 30 indicating that the execution of the function corresponding to the second voice command "Play channel 10" is impossible.

According to an embodiment, when the controller 170 determines that the second voice command is not the voice command that is continuous to the first voice command, the controller 170 can control the display 180 to further display the voice command extracted as being connected to the first voice command.

That is, the controller 170 can control the display 180 to display an addable voice command extracted based on the required context of the first voice command. In this case, there is an advantage that the display device 100 can guide the user about which voice command is received when the display device 100 operates.

FIG. 8A is an example showing a method by which the display device receives the first voice command, according to an embodiment of the present disclosure.

Since this is the same as that of FIG. 7A, a redundant description thereof will be omitted.

FIG. 8B is an example showing a method by which the display device receives a context switch command and performs an operation corresponding thereto, according to an embodiment of the present disclosure.

As shown in FIG. 8A, the controller 170 can acquire "Find an action movie other than this on the Internet" as the second voice command in a state in which the action movie search result information 10 including the action movie items 11, 12, and 13 is displayed.

In this case, the controller 170 can acquire the context switch command by extracting 'other than this' from the second voice command. The controller 170 can reset the execution condition context upon acquiring the context switch command.

The controller 170 can regard "Find an action movie on the Internet" as the first voice command. Therefore, the controller 170 can execute a function corresponding to "Find an action movie on the Internet". As a result, as shown in FIG. 8B, the controller 170 can control the display 180 to display a result of searching for an action movie on the Internet.

In this way, the controller 170 can continuously receive the voice command even after the execution condition context is reset according to the context switch command.

Figure 8C:
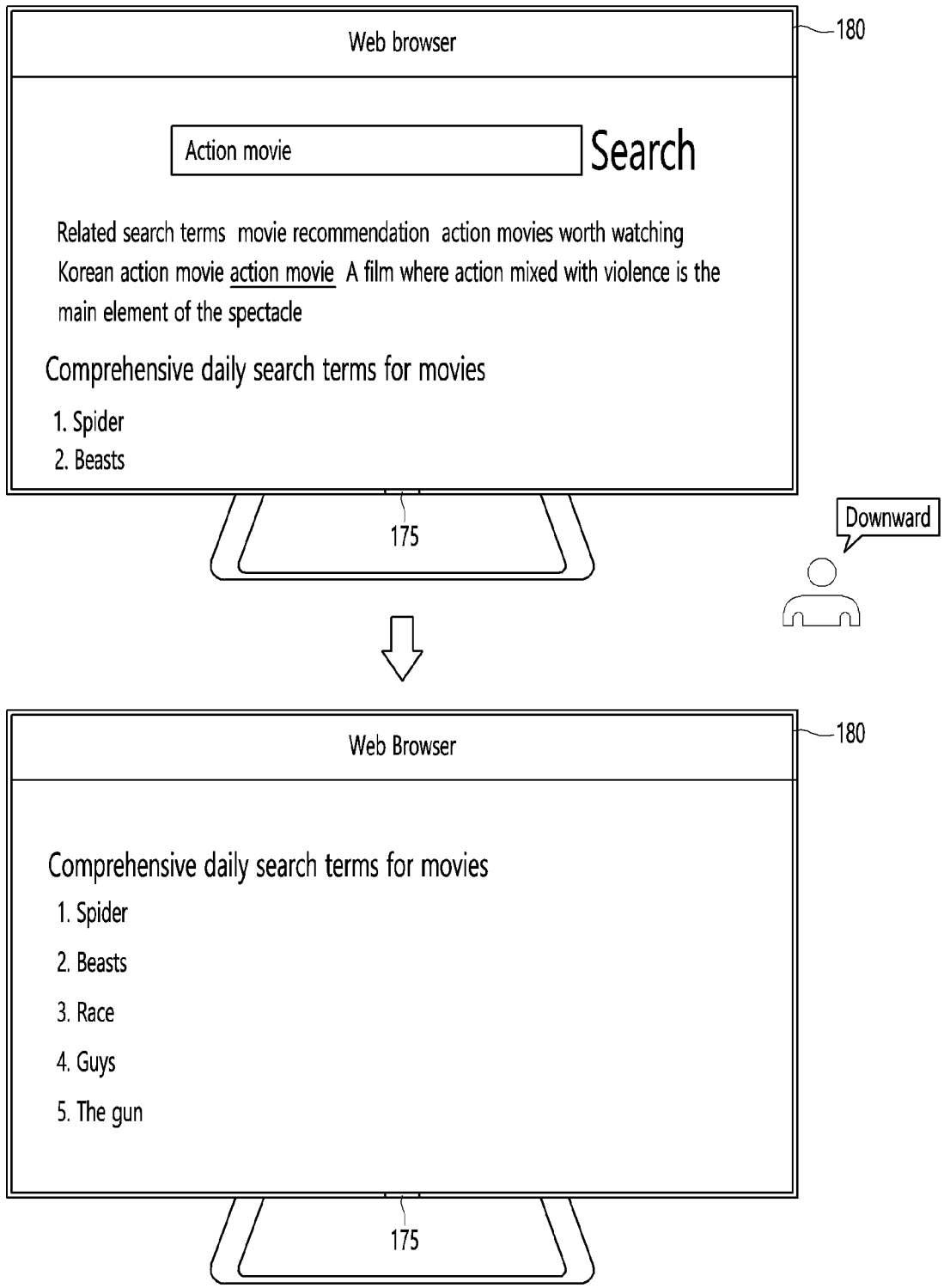
FIG. 8C is an example showing a method by which the display device receives the second voice command and performs an operation corresponding thereto, according to an embodiment of the present disclosure.

FIG. 8C is an example showing a method by which the display device receives the second voice command and performs an operation corresponding thereto, according to an embodiment of the present disclosure.

The controller 170 can acquire "down" as the second voice command in a state in which the action movie search result on the Internet is displayed as shown in FIG. 8B.

Since the required context of the first voice command "Find an action movie on the Internet" is navigation/scroll and the execution context of the second voice command "down" is scroll, the controller 170 can determine that the second voice command is the voice command connected to the first voice command.

Therefore, the controller 170 can determine that the second voice command "down" corresponds to the addable voice command, and can execute the function corresponding to the second voice command. That is, the controller 170 can control the display 180 to move the action movie search result on the Internet downward and display the action movie search result.

According to the present disclosure, when the user continuously utters a specific command, the display device 100 can recognize the voice command without continuously speaking the trigger word. In this case, there is an advantage in that only the voice command intended by the user is recognized and operated. That is, the display device 100 according to an embodiment of the present disclosure has an advantage that can filter out a voice recognition operation that deviates from the user's intention.

In addition, according to the present disclosure, the display device 100 has an advantage that can perform an operation according to a current situation even if the same voice command is recognized. For example, the display device 100 can execute a function of scrolling down when receiving a voice command "down" while displaying a web browser screen, and can move the indicator or pointer downward when receiving a voice command "down" on a search screen of the display device.

As described above, the display device 100 according to an embodiment of the present disclosure has an advantage that can minimize user inconvenience when a remote user utters a command.

The above description is merely illustrative of the technical idea of the present disclosure, and various modifications and changes may be made thereto by those skilled in the art without departing from the essential characteristics of the present disclosure.

Therefore, the embodiments of the present disclosure are not intended to limit the technical spirit of the present disclosure but to illustrate the technical idea of the present disclosure, and the technical spirit of the present disclosure is not limited by these embodiments.

The scope of protection of the present disclosure should be interpreted by the appending claims, and all technical ideas within the scope of equivalents should be construed as falling within the scope of the present disclosure.

The invention claimed is:

1. A display device comprising:
   a display;
   a microphone;
   a storage; and
   a controller configured to:
   acquire, via the microphone, a first voice command concurrent with the display device operating in a continuous speech mode;
   execute a function corresponding to the first voice command;
   control the display to display a result of executing the function corresponding to the first voice command;
   acquire, from the storage, a required context corresponding to the first voice command, wherein the required context is for determining whether to operate according to a next voice command when the next voice command is received;
   based on the required context corresponding to the first voice command, acquire, from the storage, at least one addable command that is connected to the first voice command, concurrent with the display device operating in the continuous speech mode, wherein the acquiring of the at least one addable command in the continuous speech mode is for freeing a user of the display device from being required to operate the display device via a remote control device, based on the displayed result of executing the function corresponding to the first voice command;

control the display to display the at least one addable command;

after acquiring the first voice command, acquire, via the microphone, a second voice command;

acquire, from the storage, an execution context corresponding to the second voice command, wherein the execution context is for determining whether to execute a voice command;

determine whether the second voice command corresponds to the at least one addable command, by comparing the required context corresponding to the first voice command with the execution context corresponding to the second voice command; and execute a function corresponding to the second voice command based on determining that the second voice command is a voice command connected to the first voice command.

2. The display device of claim 1, wherein, when the controller determines that the second voice command is not the voice command connected to the first voice command, the controller is configured not to execute the function corresponding to the second voice command.

3. The display device of claim 2, wherein, when the controller determines that the second voice command is not the voice command connected to the first voice command, the controller is configured to control the display to display a message indicating that executing the function corresponding to the second voice command is impossible.

4. The display device of claim 1, wherein the controller is configured to determine the second voice command is the voice command connected to the first voice command when the execution context of the second voice command is included in the required context of the first voice command.

5. The display device of claim 1, wherein, when the execution context of the second voice command is not included in the required context of the first voice command, the controller is configured to determine that the second voice command is a voice command not connected to the first voice command.

6. The display device of claim 1, wherein, after the first voice command is acquired and before the second voice command is acquired, the controller is configured to extract at least one voice command determined as being connected to the first voice command.

7. The display device of claim 6, wherein, when the second voice command corresponds to the at least one voice command extracted as being connected to the first voice command, the controller is configured to execute the function corresponding to the second voice command.

8. The display device of claim 6, wherein the controller is configured to control the display to display the at least one voice command extracted as being connected to the first voice command.

9. The display device of claim 1, wherein the controller is configured to determine a voice command in which the execution context is a required context of the first voice command as being connected to the first voice command.

10. The display device of claim 1, wherein, when the controller acquires a context switch command from the first voice command, the controller is configured to reset an execution condition context.

11. The display device of claim 1, wherein when the first voice command is different, the controller is configured to perform a different operation even when the second voice command is the same.

12. The display device of claim 1, wherein the storage is configured to store a table in which execution contexts and required contexts for a plurality of voice commands are mapped.

* * * * *